United States Patent
Ikeda et al.

(10) Patent No.: US 9,722,385 B2
(45) Date of Patent: Aug. 1, 2017

(54) LASER CHAMBER

(71) Applicant: Gigaphoton Inc., Tochigi-ken (JP)

(72) Inventors: Hiroyuki Ikeda, Oyama (JP); Kouji Kakizaki, Oyama (JP); Hiroaki Tsushima, Oyama (JP); Hisakazu Katsuumi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/198,433

(22) Filed: Jun. 30, 2016

(65) Prior Publication Data

US 2016/0308324 A1  Oct. 20, 2016

Related U.S. Application Data

(63) Continuation of application No. PCT/JP2015/053371, filed on Feb. 6, 2015.

(30) Foreign Application Priority Data

Feb. 21, 2014  (WO) .................. PCT/JP2014/054230

(51) Int. Cl.
*H01S 3/038* (2006.01)
*H01S 3/097* (2006.01)
(Continued)

(52) U.S. Cl.
CPC .............. *H01S 3/038* (2013.01); *H01S 3/036* (2013.01); *H01S 3/09702* (2013.01);
(Continued)

(58) Field of Classification Search
CPC ...... H01S 3/038; H01S 3/0381; H01S 3/0382; H01S 3/0385; H01S 3/036; H01S 3/225; H01S 3/2258; H01S 3/09702; H01S 3/03
See application file for complete search history.

(56) References Cited

U.S. PATENT DOCUMENTS

| 6,639,929 B2 | 10/2003 | Mizoguchi et al. |
| 6,914,919 B2 | 7/2005 | Watson et al. |

(Continued)

FOREIGN PATENT DOCUMENTS

| JP | 2003-060270 A | 2/2003 |
| JP | 2006-229137 A | 8/2006 |
| JP | 2013-141030 A | 7/2013 |

OTHER PUBLICATIONS

International Search Report issued in PCT/JP2015/053371; mailed Apr. 21, 2015.

(Continued)

*Primary Examiner* — Xinning Niu
(74) *Attorney, Agent, or Firm* — Studebaker & Brackett PC

(57) ABSTRACT

A laser chamber for a discharge excited gas laser apparatus may include: a first discharge electrode disposed in the laser chamber; a second discharge electrode disposed to face the first discharge electrode in the laser chamber; a fan configured to flow laser gas between the first discharge electrode and the second discharge electrode; a first insulating member disposed upstream and downstream of a laser gas flow from the first discharge electrode; a metallic damper member disposed upstream of the laser gas flow from the second discharge electrode; and a second insulating member disposed downstream of the laser gas flow from the second discharge electrode.

20 Claims, 15 Drawing Sheets

(51) Int. Cl.
*H01S 3/225* (2006.01)
*H01S 3/036* (2006.01)
H01S 3/03 (2006.01)
H01S 3/134 (2006.01)

(52) U.S. Cl.
CPC ............ H01S 3/225 (2013.01); H01S 3/2258 (2013.01); *H01S 3/03* (2013.01); *H01S 3/0381* (2013.01); *H01S 3/0382* (2013.01); *H01S 3/0384* (2013.01); *H01S 3/0385* (2013.01); *H01S 3/134* (2013.01)

(56) References Cited

U.S. PATENT DOCUMENTS

2003/0031225 A1\* 2/2003 Mizoguchi ............. H01S 3/225
372/55
2004/0022292 A1\* 2/2004 Morton ............... G03F 7/70025
372/55

OTHER PUBLICATIONS

Written Opinion issued in PCT/JP2015/053371; mailed Apr. 21, 2015.

\* cited by examiner

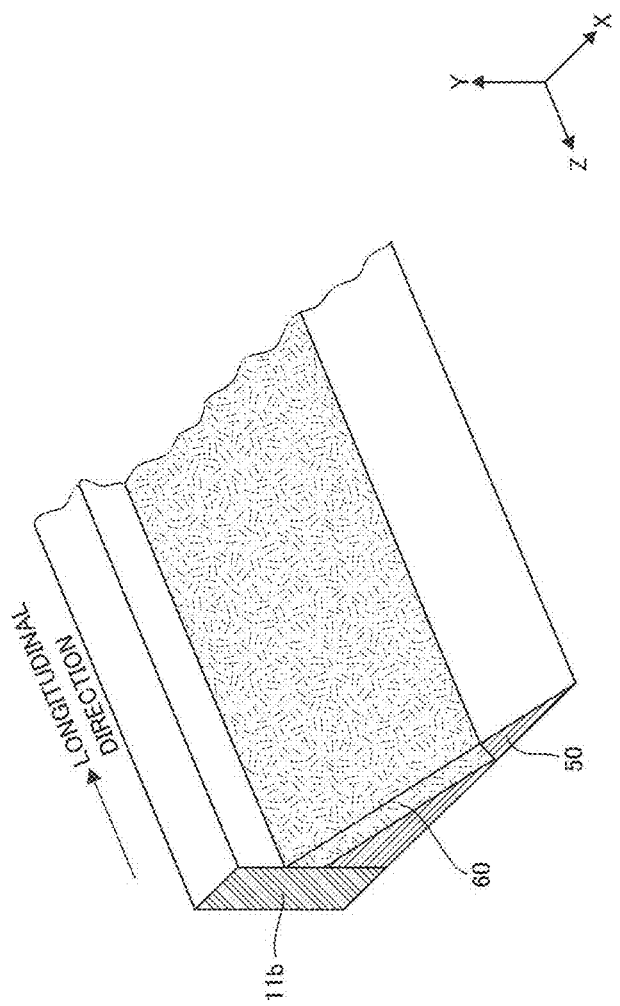

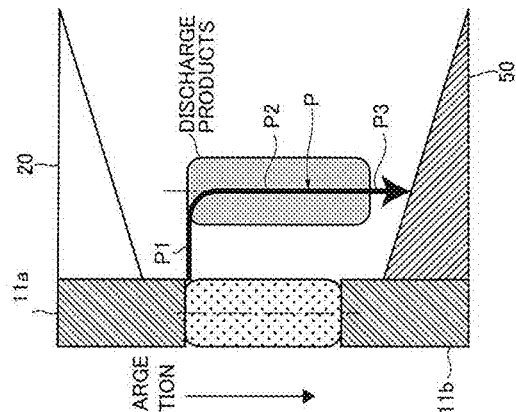
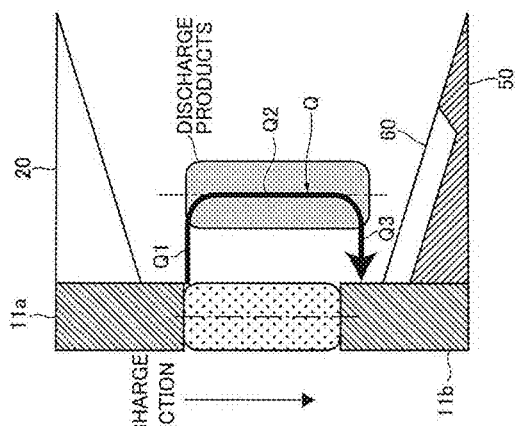
FIG. 12A
FIG. 12B

LASER CHAMBER

CROSS-REFERENCES TO RELATED APPLICATIONS

This application claims the benefit of International Patent Application No. PCT/JP2014/054230 filed Feb. 21, 2014, which is incorporated herein by reference.

BACKGROUND

1. Technical Field

The present disclosure relates to a laser chamber used in a discharge excited gas laser apparatus.

2. Related Art

The miniaturization and increased levels of integration of semiconductor integrated circuits have led to a demand for increases in the resolutions of semiconductor exposure apparatuses (hereinafter referred to as "exposure apparatus"). Accordingly, advances are being made in the reduction in the wavelengths of light emitted from exposure light sources. Gas laser apparatuses are being used as exposure light sources instead of conventional mercury lamps. At present, a KrF excimer laser apparatus that emits ultraviolet light at a wavelength of 248 nm and an ArF excimer laser apparatus that emits ultraviolet light at a wavelength of 193 nm are being used as gas laser apparatuses for exposure.

In the current generation exposure technology, immersion exposure has been realized, for reducing the apparent wavelength of an exposure light source by filling the space between the projection lens of an exposure apparatus and a wafer with a liquid, and changing the refractive index of the space. In the case where immersion exposure is carried out using an ArF excimer laser apparatus as the exposure light source, the wafer is irradiated with ultraviolet light at a wavelength of 134 nm in water. This technology is referred to as ArF immersion exposure. The ArF immersion exposure may be referred to as ArF immersion lithography.

The spectral line width of the spontaneous oscillation of a KrF or ArF excimer laser apparatus is as wide as 350 to 400 pm. Therefore, chromatic aberration occurs in a laser beam (ultraviolet light) which is reduced and projected by a projection lens of the exposure device onto a wafer, and consequently the resolution is dropped. It is therefore necessary to narrow the spectral line width of the laser beam emitted from the gas laser apparatus to the extent that the chromatic aberration is negligible. The spectral line width may be referred to as "spectral width." Accordingly, the spectral width has been narrowed by providing a line narrowing module (LNM) having line narrowing elements in a laser resonator of the gas laser apparatus. Here, the line narrowing elements may be, for example, an etalon or a grating. A laser apparatus having a narrowed spectral width in this manner is referred to as a line narrowing laser apparatus.

CITATION LIST

Patent Literature

PTL1: U.S. Pat. No. 6,914,919
PTL2: U.S. Pat. No. 6,639,929

SUMMARY

A laser chamber for a discharge excited gas laser apparatus according to an aspect of the present disclosure may include: a first discharge electrode disposed in the laser chamber; a second discharge electrode disposed to face the first discharge electrode in the laser chamber; a fan configured to flow laser gas between the first discharge electrode and the second discharge electrode; a first insulating member disposed upstream and downstream of a laser gas flow from the first discharge electrode; a metallic damper member disposed upstream of the laser gas flow from the second discharge electrode; and a second insulating member disposed downstream of the laser gas flow from the second discharge electrode.

BRIEF DESCRIPTION OF THE DRAWINGS

Hereinafter, selected embodiments of the present disclosure will be described with reference to the accompanying drawings.

FIG. 11 is a drawing explaining a sixth example of the second insulating member;

FIG. 12A is a drawing explaining the current path of an arc discharge when the arc discharge is generated in a conventional laser chamber which does not include the second insulating member;

FIG. 12B is a drawing explaining the current path of an arc discharge when the arc discharge is generated in the laser chamber according to the present embodiment which includes the second insulating member;

DESCRIPTION OF EXEMPLARY EMBODIMENTS

Contents

Figure 1:
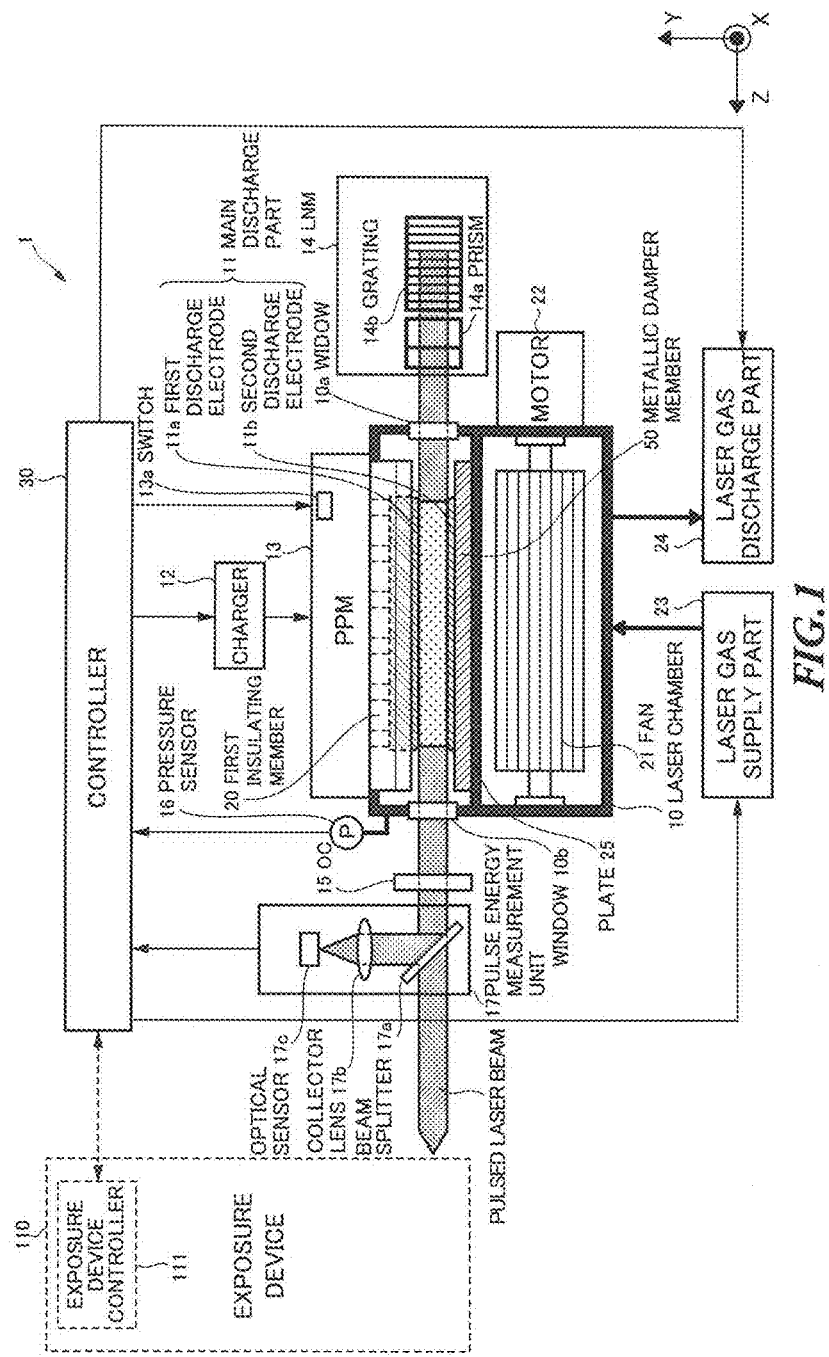
FIG. 1 schematically shows the configuration of a discharge excited gas laser apparatus.

1. Overview
2. Description of terms

3. Discharge excited gas laser apparatus
3.1 Configuration
3.2 Operation
3.3 Problem
4. Laser chamber including a second insulating member according to the present embodiment
4.1 First example of the second insulating member
4.2 Second example of the second insulating member
4.3 Third example of the second insulating member
4.4 Fourth example of the second insulating member
4.5 Fifth example of the second insulating member
4.6 Sixth example of the second insulating member
4.7 Specific example of the second insulating member and a metallic damper member
4.8 Stability of a main discharge
5. Others
5.1 Charge and discharge circuit
5.2 Hardware environment of each controller
5.3 Modification Hereinafter, selected embodiments of the present disclosure will be described in detail with reference to the accompanying drawings. The embodiments to be described below are merely examples and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. OVERVIEW

The present disclosure may disclose at least the following embodiments.

A laser chamber 10 for a discharge excited gas laser apparatus 1 may include: a first discharge electrode 11a disposed in the laser chamber 10; a second discharge electrode 11b disposed to face the first discharge electrode 11a in the laser chamber 10; a fan 21 configured to flow laser gas between the first discharge electrode 11a and the second discharge electrode 11b; a first insulating member 20 disposed upstream and downstream of a laser gas flow from the first discharge electrode 11a; a metallic damper member 50 disposed upstream of the laser gas flow from the second discharge electrode 11b; and a second insulating member 60 disposed downstream of the laser gas flow from the second discharge electrode 11b. With this configuration, it is possible to generate a stable discharge in the laser chamber 10.

2. DESCRIPTION OF TERMS

"Optical path" means a path through which a pulsed laser beam passes. The optical path may be an axis passing through the center of a beam cross-section of the pulsed laser beam along the traveling direction of the pulsed laser beam.

3. DISCHARGE EXCITED GAS LASER APPARATUS

3.1 Configuration

Figure 2:
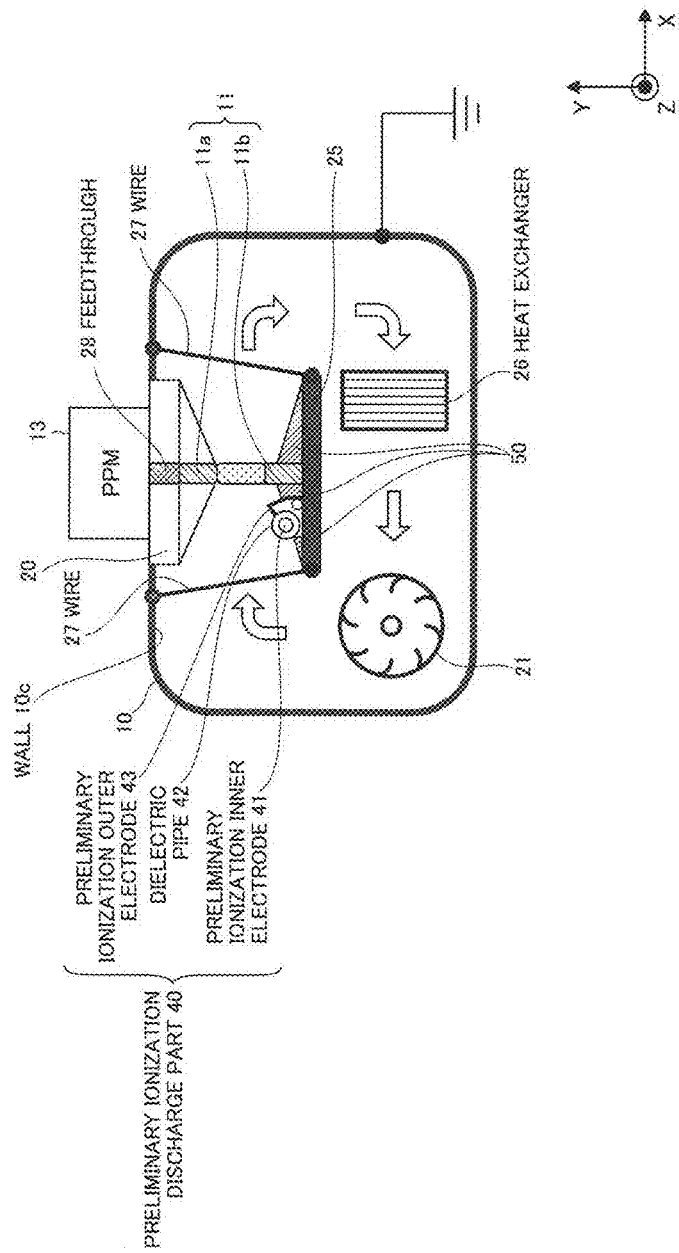
FIG. 2 is a drawing showing the laser chamber shown in FIG. 1 from a Z-axis direction.

With reference to FIGS. 1 and 2, the configuration of the discharge excited gas laser apparatus 1 will be described. FIG. 1 schematically shows the configuration of the discharge excited gas laser apparatus 1. FIG. 2 is a drawing showing the laser chamber 10 shown in FIG. 1 from the Z-axis direction. In FIG. 1, the laser oscillation direction of the discharge excited gas laser apparatus 1 is defined as the Z-axis. That is, the direction in which a pulsed laser beam is outputted from the laser chamber 10 to an exposure device 110 is defined as the Z-axis. An X-axis and a Y-axis are orthogonal to the Z-axis, and are orthogonal to one another. The same definition of these coordinate axes will be applied to the other drawings described later.

The discharge excited gas laser apparatus 1 may be an excimer laser apparatus. Laser gas as a laser medium may include rare gas such as argon or krypton, halogen gas such as fluorine, and buffer gas such as neon or helium, or a mixture thereof.

The discharge excited gas laser apparatus 1 may include the laser chamber 10, a laser resonator, a charger 12, a pulse power module (PPM) 13, a pressure sensor 16, a pulse energy measurement unit 17, a motor 22, a laser gas supply part 23, a laser gas discharge part 24, and a controller 30.

The laser chamber 10 may enclose the laser gas. The laser chamber 10 may include a main discharge part 11, a preliminary ionization discharge part 40, a window 10a, a window 10b, a plate 25, a wire 27, a feedthrough 28, the first insulating member 20, the metallic damper member 50, and the fan 21.

The main discharge part 11 may include the first discharge electrode 11a and the second discharge electrode 11b. The first discharge electrode 11a and the second discharge electrode 11b may be a pair of electrodes to excite the laser gas by a main discharge. The main discharge may be a glow discharge. The first discharge electrode 11a and the second discharge electrode 11b may be formed by plate-like conductive members, respectively. The first discharge electrode 11a and the second discharge electrode 11b may be arranged to face one another with a predetermined distance therebetween, in approximately parallel with one another in their longitudinal direction. The first discharge electrode 11a and the second discharge electrode 11b may be arranged such that their discharge surfaces face one another.

With the present embodiment, the space between the discharge surface of the first discharge electrode 11a and the discharge surface of the second discharge electrode 11b may be referred to as "discharge space." The laser gas enclosed in the laser chamber 10 may exist in the discharge space. A main discharge may be generated in the discharge space.

The first discharge electrode 11a may be a cathode electrode. The surface opposite to the discharge surface of the first discharge electrode 11a may be connected to the PPM 13 via the feedthrough 28. The PPM 13 may apply a pulse voltage between the first discharge electrode 11a and the second discharge electrode 11b. The side surface of the first discharge electrode 11a may be surrounded by the first insulating member 20 fixed to a wall 10c of the laser chamber 10. The first discharge electrode 11a may be electrically insulated from the wall 10c by the first insulating member 20.

The second discharge electrode 11b may be an anode electrode. The surface opposite to the discharge surface of the second discharge electrode 11b may be fixed to the plate 25. The side surface of the second discharge electrode 11b may be surrounded by the metallic damper member 50 fixed to the plate 25.

The plate 25 may be formed with a conductive member. The plate 25 may be fixed to the wall 10c of the laser chamber 10. The plate 25 may be connected to the grounded wall 10c via the wire 27. The plate 25 may be maintained at a ground potential.

The preliminary ionization discharge part 40 may be an electrode to preliminarily ionize the laser gas by a corona discharge prior to the main discharge by the main discharge part 11. The preliminary ionization discharge part 40 may be fixed to the plate 25. The preliminary ionization discharge part 40 may be disposed upstream of the laser gas flow from the second discharge electrode 11b. The preliminary ionization discharge part 40 may be surrounded by the metallic damper member 50 fixed to the plate 25.

The preliminary ionization discharge part 40 may include a preliminary ionization inner electrode 41, a dielectric pipe 42, and a preliminary ionization outer electrode 43. The dielectric pipe 42 may be formed in a cylindrical shape. The dielectric pipe 42 may be disposed such that its longitudinal direction is approximately parallel to the longitudinal direction of the main discharge part 11. The preliminary ionization inner electrode 41 may be formed in a rod shape. The preliminary ionization inner electrode 41 may be inserted into the dielectric pipe 42 and fixed to the inner periphery of the dielectric pipe 42. The end of the preliminary ionization inner electrode 41 may be connected to the PPM 13 via the feedthrough 28. The preliminary ionization outer electrode 43 may be formed in a plate-like shape having a bending portion. The preliminary ionization outer electrode 43 may be disposed such that its longitudinal direction is approximately parallel to the longitudinal direction of the dielectric pipe 42. The side surface of the preliminary ionization outer electrode 43 in the longitudinal direction may be fixed to the outer periphery of the dielectric pipe 42 and the plate 25.

The first insulating member 20 may electrically insulate between the first discharge electrode 11a as a cathode electrode and the wall 10c of the laser chamber 10. The first insulating member 20 may be made of an insulating material having a low reactivity with the laser gas. When the laser gas is fluorine, the first insulating member 20 may be made of, for example, alumina ceramics. The first insulating member 20 may be provided to surround the side surfaces of the first discharge electrode 11a and the feedthrough 28. The first insulating member 20 may be fixed to the wall 10c of the laser chamber 10. By this means, the first insulating member 20 may hold the first discharge electrode 11a and the feedthrough 28 on the wall 10c.

The first insulating member 20 may be disposed upstream and downstream of the laser gas flow from the first discharge electrode 11a. Part of the first insulating member 20, which is located upstream of the laser gas flow from the first discharge electrode 11a, may have a tapered surface increasing in the thickness from the upstream to the downstream. Meanwhile, part of the first insulating member 20, which is located downstream of the laser gas flow from the first discharge electrode 11a, may have a tapered surface decreasing in the thickness from the upstream to the downstream. By this means, it is possible to guide the laser gas to the tapered surfaces of the first insulating member 20 and efficiently flow the laser gas between the first discharge electrode 11a and the second discharge electrode 11b.

The metallic damper member 50 may absorb acoustic waves generated by the main discharge. The metallic damper member 50 may be made of a porous metallic material having a low reactivity with the laser gas. When the laser gas is fluorine, the metallic damper member 50 may be made of a material such as nickelic and nickel chrome alloy. By this means, the metallic damper member 50 can absorb most of the acoustic waves generated by the main discharge.

The metallic damper member 50 may be provided to surround the side surfaces of the second discharge electrode 11b and the preliminary ionization discharge part 40. The metallic damper member 50 may be fixed to the plate 25. By this means, the metallic damper member 50 may hold the second discharge electrode 11b and the preliminary ionization discharge part 40 on the plate 25.

The metallic damper member 50 is made of a porous metallic material, and therefore may prevent the generation of debris or dust due to the impact of the acoustic waves. If the metallic damper member 50 is made of a porous ceramic material or resin material, instead of the porous metallic material, debris or dust may be generated from the ceramic material or resin material due to the impact of the acoustic waves. If debris or dust is generated in the laser chamber 10, the discharge becomes unstable, and therefore the pulse energy of the pulsed laser beam may be reduced. Therefore, it is preferred that the metallic damper member 50 is made of a porous metallic material.

In particular, it is preferred that the metallic damper member 50 disposed around the second discharge electrode 11b is made of a porous metallic material. The discharge direction of the main discharge is from the first discharge electrode 11a as a cathode electrode to the second discharge electrode 11b as an anode electrode. The impact force of the acoustic waves generated by the main discharge may be greater on the anode electrode located on the front end side of the discharge direction than on the cathode electrode located on the base end side of the discharge direction. Therefore, if not the metallic damper member 50 but a damper member made of a porous ceramic material or resin material is disposed around the second discharge electrode 11b as an anode electrode subjected to a stronger impact force of the acoustic waves, a lot of debris or dust may be generated. In contrast, if the metallic damper member 50 made of a porous metallic material is disposed around the second discharge electrode 11b as an anode electrode, it is possible to prevent the generation of debris or dust due to the impact of the acoustic waves. Accordingly, it is preferred that the metallic damper member 50 is made of a porous metallic material.

The metallic damper member 50 may be located at least upstream of the laser gas flow from the second discharge electrode 11b. Preferably, the metallic damper member 50 may be located upstream and downstream of the laser gas flow from the second discharge electrode 11b. Part of the metallic damper member 50 located upstream of the laser gas flow from the second discharge electrode 11b may have a tapered surface increasing in the thickness from the upstream to the downstream. Meanwhile, part of the metallic damper member 50 located downstream of the laser gas flow from the second discharge electrode 11b may have a tapered surface decreasing in the thickness from the upstream to the downstream. By this means, it is possible to guide the laser gas to the tapered surfaces of the metallic damper member 50 and efficiently flow the laser gas between the first discharge electrode 11a and the second discharge electrode 11b. Moreover, part of the acoustic waves generated by the main discharge may be reflected from the tapered surfaces of the metallic damper member 50 to be apart from the discharge space.

The fan 21 may circulate the laser gas in the laser chamber 10. The fan 21 may be a crossflow fan. The fan 21 may be disposed such that its longitudinal direction is approximately parallel to the longitudinal direction of the first discharge electrode 11a and the second discharge electrode 11b. The fan 21 may be disposed opposite to the discharge space with respect to the plate 25. The fan 21 may be rotated by driving the motor 22. The rotating fan 21 may generate a laser gas flow.

When the fan 21 is rotated, the laser gas in the laser chamber 10 may be approximately uniformly blown out in the direction perpendicular to the longitudinal direction of the fan 21. The laser gas blown out of the fan 21 may flow into the discharge space. The direction of the laser gas flowing into the discharge space may be perpendicular to the longitudinal direction of the first discharge electrode 11a and the second discharge electrode 11b. The laser gas having flowed into the discharge space may flow out of this discharge space. The direction of the laser gas flowing out of the discharge space may be perpendicular to the longitudinal direction of the first discharge electrode 11a and the second discharge electrode 11b. The laser gas having flowed out of the discharge space may be sucked into the fan 21 via a heat exchanger 26.

The heat exchanger 26 may perform a heat exchange between a refrigerant supplied into the heat exchanger 26 and the laser gas. The amount of the refrigerant supplied into the heat exchanger 26 may be changed according to the control of the controller 30. When the amount of the supplied refrigerant is changed, the amount of the heat transferring from the laser gas to the refrigerant may be changed. By this means, it is possible to adjust the temperature of the laser gas in the laser chamber 10.

The motor 22 may rotate the fan 21. The motor 22 may be a stepping motor or a servomotor. The motor 22 may change the number of the rotation of the fan 21 according to the control of the controller 30.

The charger 12 may be constituted by, for example, a capacitor connected to a power supply unit (not shown). The charger 12 may store electric energy to apply a voltage to the main discharge part 11. The charger 12 may output the electric energy to the PPM 13 according to the control of the controller 30.

The PPM 13 may apply a voltage to the main discharge part 11 and the preliminary ionization discharge part 40. The PPM 13 may include a switch 13a controlled by the controller 30. When the switch 13a is turned from off to on, the PPM 13 may generate a pulsed voltage from the electric energy stored in the charger 12. The PPM 13 may apply the generated pulsed voltage to the main discharge part 11 and the preliminary ionization discharge part 40.

Figure 14:
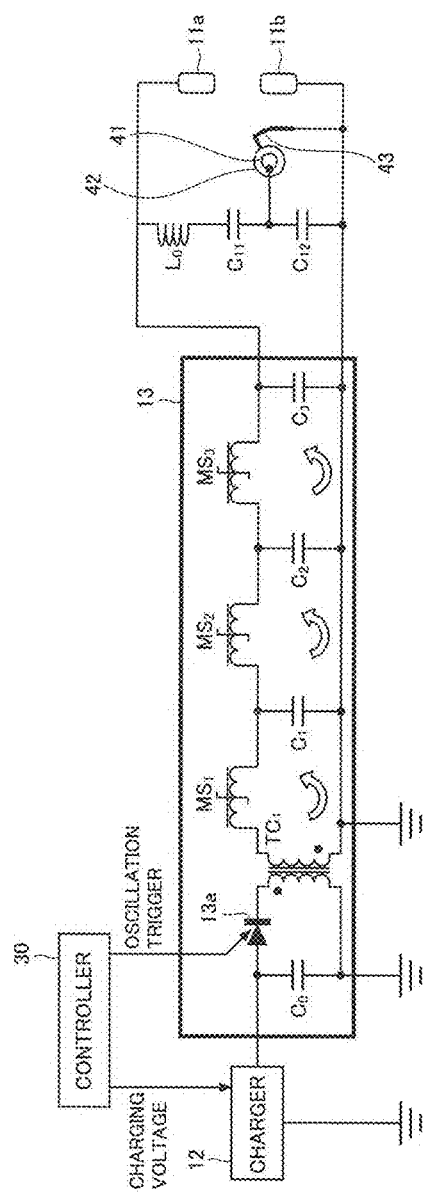
FIG. 14 is a drawing explaining the circuit configuration of a charge and discharge circuit used in the discharge excited gas laser apparatus.

Here, the charge and discharge circuit for the discharge excited gas laser apparatus 1 including the main discharge part 11, the preliminary ionization discharge part 40, the charger 12 and the PPM 13 will be described later with reference to FIG. 14.

The laser resonator may be constituted by a line narrowing module (LNM) 14 and an output coupler (OC) 15. The LNM 14 may include a prism 14a and a grating 14b.

The prism 14a may expand the beam width of the light emitted from the laser chamber 10 via the window 10a. The prism 14a may allow the expanded light to transmit therethrough toward the grating 14b. The light transmitting through the prism 14a toward the grating 14b may be refracted at different angles corresponding to the wavelengths of the light. The prism 14a may function as a wavelength dispersion element.

The grating 14b may be a wavelength dispersion element having a number of grooves formed in its surface at a predetermined interval. The grating 14b may be provided in a Littrow configuration so that the incident angle is the same as the diffraction angle. The grating 14b may be made of a material having a high reflectivity. Each of the grooves formed in the grating 14b may be, for example, a triangular groove. The light entering the grating 14b from the prism 14a may be reflected from the slopes of the grooves toward various directions perpendicular to the direction in which the grooves extend. The direction in which the grooves extend may correspond to a Y direction shown in FIG. 1. When a light component reflected from one groove is superposed on a light component reflected from another groove, the difference in the optical path length between the reflected light components may depend on the angles of the reflection of the reflected light components. The reflected light components of the light having a wavelength corresponding to the difference in the optical path length may be in phase and therefore be strengthen with one another. On the other hand, the reflected light components having a wavelength not corresponding to the difference in the optical path length may be out of phase and therefore be weaken by one another. Due to this effect of the interference, the grating 14b can selectively pick out the light having the approximately specific wavelength, depending on the angle of the reflection. The light having an approximately specific wavelength may return from the grating 14b back to the laser chamber 10 through the prism 14a and the window 10a. By this means, it is possible to narrow the spectral width of the light that returns from the grating 14b to the laser chamber 10.

The OC 15 may allow part of the light emitted from the laser chamber 10 to transmit therethrough while reflecting part of the remaining light back to the laser chamber 10. A partial reflection coating may be applied to the surface of the OC 15. The distance between the OC 15 and the grating 14b may be determined to have a length for which the light emitted from the laser chamber 10 can form a standing wave. By this means, the OC 15 and the LNM 14 may form the laser resonator.

The light emitted from the laser chamber 10 may reciprocate between the LNM 14 and the OC 15. In this case, the light emitted from the laser chamber 10 may be amplified every time the light passes through the main discharge part 11 in the laser chamber 10. Part of the amplified light may transmit through the OC 15. The light having transmitted through the OC 15 may be outputted to the exposure device 110 via the pulse energy measurement unit 17, as a pulsed laser beam.

The pulse energy measurement unit 17 may measure the pulse energy of the pulsed laser beam having transmitted through the OC 15, and output the result of the measurement to the controller 30. The pulse energy measurement unit 17 may include a beam splitter 17a, a collector lens 17b and an optical sensor 17c.

The beam splitter 17a may be provided on the optical path of the pulsed laser beam. The beam splitter 17a may allow the pulsed laser beam having transmitted through the OC 15 to transmit therethrough toward the exposure device 110 with a high transmittance. The beam splitter 17a may reflect part of the pulsed laser beam having transmitted through the OC 15 toward the collector lens 17b. The collector lens 17b may focus the pulsed laser beam reflected from the beam splitter 17a on a light receiving surface of the optical sensor 17c. The optical sensor 17c may detect the pulsed laser beam focused on the light receiving surface. The optical sensor 17c may measure the pulse energy of the detected pulsed laser beam. The optical sensor 17c may output a signal indicative of the measured pulse energy to the controller 30.

The pressure sensor 16 may detect the gas pressure in the laser chamber 10. The pressure sensor 16 may output a detection signal indicative of the detected gas pressure to the controller 30.

The laser gas supply part 23 may supply the laser gas into the laser chamber 10. The laser gas supply part 23 may include a gas bomb, a valve, and a flow control valve (not shown).

The gas bomb may be filled with the laser gas. The valve may block off the laser gas flow from the gas bomb to the laser chamber 10. The flow control valve may change the amount of the laser gas being supplied from the gas bomb into the laser chamber 10.

The laser gas supply part 23 may open and close the valve according to the control of the controller 30. The laser gas supply part 23 may change the degree of the opening of the flow control valve according to the control of the controller 30. When the degree of the opening of the flow control valve is changed, the amount of the laser gas being supplied into the laser chamber 10 may be changed. By this means, it is possible to adjust the gas pressure in the laser chamber 10.

The laser gas discharge part 24 may discharge the laser gas in the laser chamber 10 to the outside of the laser chamber 10. The laser gas discharge part 24 may include a valve and an exhaust pump (not shown).

The valve may block off the laser gas flow from the inside to the outside of the laser chamber 10. The exhaust pump may suck in the laser gas in the laser chamber 10.

The laser gas discharge part 24 may open and close the valve according to the control of the controller 30. The laser gas discharge part 24 may activate the exhaust pump according to the control of the controller 30. When the exhaust pump is activated, the laser gas in the laser chamber 10 may be sucked into the exhaust pump. By this means, it is possible to discharge the laser gas in the laser chamber 10 to the outside of the laser chamber 10, and therefore to reduce the gas pressure in the laser chamber 10.

The controller 30 may send/receive various signals to/from an exposure device controller 111 of the exposure device 110. For example, a signal indicative of a target pulse energy or a target oscillation timing of the pulsed laser beam outputted to the exposure device 110 may be sent from the exposure device controller 111 to the controller 30. The controller 30 may totally control the operation of each component of the discharge excited gas laser apparatus 1, based on various signals sent from the exposure device controller 111.

A signal indicative of the pulse energy, which is outputted from the pulse energy measurement unit 17, may be inputted to the controller 30. Based on this signal indicative of the pulse energy and the signal indicative of the target pulse energy sent from the exposure device controller 111, the controller 30 may determine the charging voltage of the charger 12. The controller 30 may output a control signal corresponding to the determined charging voltage to the charger 12. This control signal may be a signal for controlling the operation of the charger 12 to set the determined charging voltage in the charger 12. The controller 30 may determine the timing to apply the pulse voltage to the main discharge part 11, based on the signal indicative of the pulse energy sent from the pulse energy measurement unit 17 and the signal indicative of the target oscillation timing sent from the exposure device controller 111. The controller 30 may output an oscillation trigger signal corresponding to the determined timing to the PPM 13. This oscillation trigger signal may be a control signal for controlling the operation of the PPM 13 to turn the switch 13a on or off according to the determined timing.

A detection signal indicative of the gas pressure outputted from the pressure sensor 16 may be inputted to the controller 30. The controller 30 may determine the gas pressure of the laser gas in the laser chamber 10, based on the detection signal indicative of the gas pressure and the charging voltage of the charger 12. The controller 30 may output the control signal corresponding to the determined gas pressure to the laser gas supply part 23 or the laser gas discharge part 24. This control signal may be a signal for controlling the operation of the laser gas supply part 23 or the laser gas discharge part 24 to supply/discharge the laser gas to/from the laser chamber 10, based on the determined gas pressure. Here, the hardware configuration of the controller 30 will be described later with reference to FIG. 15.

3.2 Operation

The controller 30 may drive the motor 22 to rotate the fan 21. By this means, it is possible to circulate the laser gas in the laser chamber 10. The controller 30 may receive a signal indicative of a target pulse energy Et and a target oscillation timing sent from the exposure device controller 111. The controller 30 may set a charging voltage Vhv corresponding to the target pulse energy Et in the charger 12. The controller 30 may store the value of the charging voltage Vhv set in the charger 12. The controller 30 may operate the switch 13a of the PPM 13 in synchronization with the target oscillation timing.

When the switch 13a of the PPM 13 is turned from off to on, a voltage may be applied between the preliminary ionization inner electrode 41 and the preliminary ionization outer electrode 43 of the preliminary ionization discharge part 40. Then, a voltage may be applied between the first discharge electrode 11a and the second discharge electrode 11b of the main discharge part 11. By this means, a corona discharge may be generated in the preliminary ionization discharge part 40, so that ultraviolet (UV) light is generated. When the laser gas in the discharge space of the main discharge part 11 is irradiated with the UV light, the laser gas may be preliminarily ionized. After that, a main discharge may be generated in the discharge space of the main discharge part 11. Here, the discharge direction of the main discharge is a direction from the first discharge electrode 11a as a cathode electrode to the second discharge electrode 11b as an anode electrode. When the main discharge is generated, the laser gas in the discharge space may be excited and emit light.

The light emitted from the laser gas may be reflected from the LNM 14 and the OC 15 constituting the laser resonator, and reciprocate in the laser resonator. The spectral width of the light reciprocating in the laser resonator may be narrowed by the LNM 14. The light reciprocating in the laser resonator may be amplified every time the light passes through the main discharge part 11. After that, part of the amplified light may transmit through the OC 15. The light having transmitted through the OC 15 may be outputted to the exposure device 110 as a pulsed laser beam.

Part of the pulsed laser beam having transmitted through the OC 15 may enter the pulse energy measurement unit 17. The pulse energy measurement unit 17 may measure a pulse energy E of the pulsed laser beam having entered the pulse energy measurement unit 17, and output the result of the measurement to the controller 30.

The controller 30 may store the pulse energy E measured by the pulse energy measurement unit 17. The controller 30 may calculate a difference $\Delta E$ between the pulse energy E as a measured value and the target pulse energy Et. The controller 30 may calculate an increase/decrease $\Delta Vhv$ in the charging voltage Vhv which corresponds to the difference $\Delta E$. The controller 30 may add the calculated $\Delta Vhv$ to the charging voltage Vhv stored as described above to calculate the charging voltage Vhv to be newly set. In this way, the controller 30 may perform a feedback control of the charging voltage Vhv.

When the charging voltage Vhv set newly is greater than an allowable maximum value, the controller 30 may control the laser gas supply part 23 to supply the laser gas into the laser chamber 10 until the gas pressure in the laser chamber 10 becomes a predetermined gas pressure. On the other hand, when the charging voltage Vhv set newly is smaller than an allowable minimum value, the controller 30 may control the laser gas discharge part 24 to discharge the laser gas from the laser chamber 10 until the gas pressure in the laser chamber 10 becomes a predetermined gas pressure.

3.3 Problem

Figure 3:
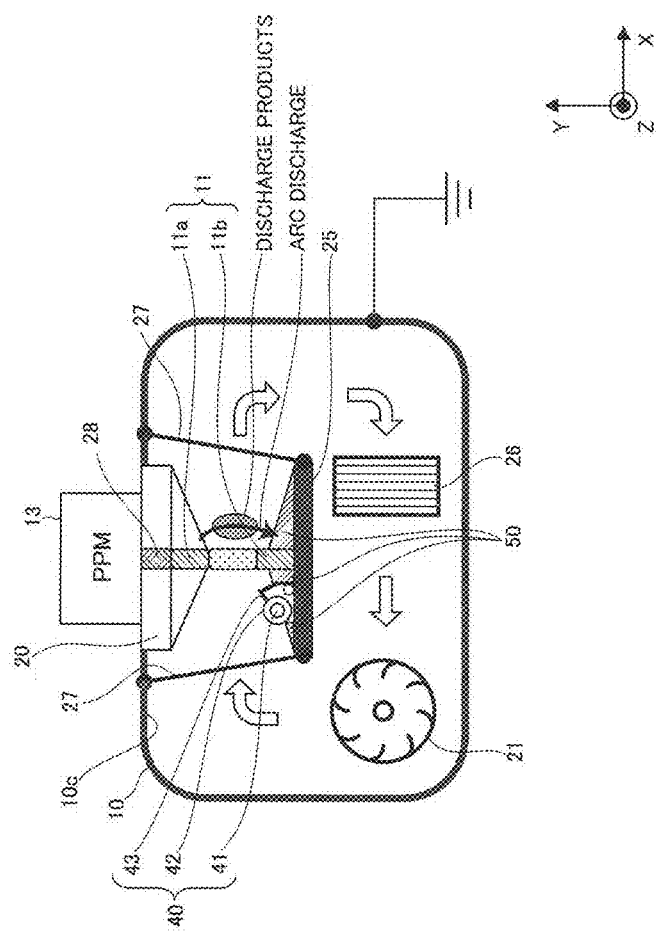
FIG. 3 is a drawing explaining an arc discharge generated in the laser chamber shown in FIG. 2.

As shown in FIG. 3, in the discharge excited gas laser apparatus 1, discharge products may be generated in the discharge space due to the main discharge. The discharge products may be ions or active species generated by the ionization of the laser gas due to the main discharge. The discharge products generated in the discharge space may move from the discharge space to the downstream of the laser gas flow, due to the laser gas flow generated by the rotation of the fan 21.

In the discharge excited gas laser apparatus 1, when the fan 21 is rotated with the power consumption reduced or when the fan 21 is activated or stopped, the number of the rotation of the fan 21 may be smaller than the normal time. When the number of the rotation of the fan 21 is reduced, the flow velocity of the laser gas passing through the discharge space may be reduced. When the flow velocity of the laser gas is reduced, the discharge products may not be sufficiently spaced from the discharge space but stay near the main discharge part 11. The discharge products have a discharge resistance smaller than the laser gas having not ionized.

Therefore, if the discharge products stay near the main discharge part 11, when a pulse voltage is newly applied to the main discharge part 11, the main discharge generated in the main discharge part 11 may not be stable. To be more specific, in this case, the main discharge of the main discharge part 11 may be generated from the first discharge electrode 11a to the second discharge electrode 11b via the discharge products. This discharge is an arc discharge which causes an excessive current flow, and therefore may be unstable, differently from a glow discharge which is a normal main discharge. Moreover, the main discharge of the main discharge part 11 may be generated from the first discharge electrode 11a to the metallic damper member 50 via the discharge products. As a result, the pulse energy of the pulsed laser beam outputted from the discharge excited gas laser apparatus 1 may be unstable. In particular, if the repetition frequency of the discharge excited gas laser apparatus 1 is increased, the effect of the discharge products on the instability of the main discharge may be increased. As a result, the instability of the pulse energy of the pulsed laser beam may be further increased. Therefore, there is a demand for a technology that can generate a stable discharge even if the number of the rotation of the fan 21 is reduced.

4. LASER CHAMBER INCLUDING A SECOND INSULATING MEMBER ACCORDING TO THE PRESENT EMBODIMENT

Now, with reference to FIGS. 4 to 11, the laser chamber 10 including the second insulating member according to the present embodiment will be described. The laser chamber 10 according to the present embodiment may have a configuration in which a second insulating member 60 is added to the laser chamber 10 shown in FIGS. 1 and 2. The configuration of the chamber 10 according to the present embodiment may be the same as the configuration of the laser chamber 10 shown in FIGS. 1 and 2, except the second insulating member 60. The configuration of the laser chamber 10 according to the present embodiment, which is the same as that of the laser chamber 10 shown in FIGS. 1 and 2, is not described again here. Now, first to sixth examples of the second insulating member 60 of the laser chamber 10 according to the present embodiment will be described.

4.1 First Example of the Second Insulating Member

Figure 4:
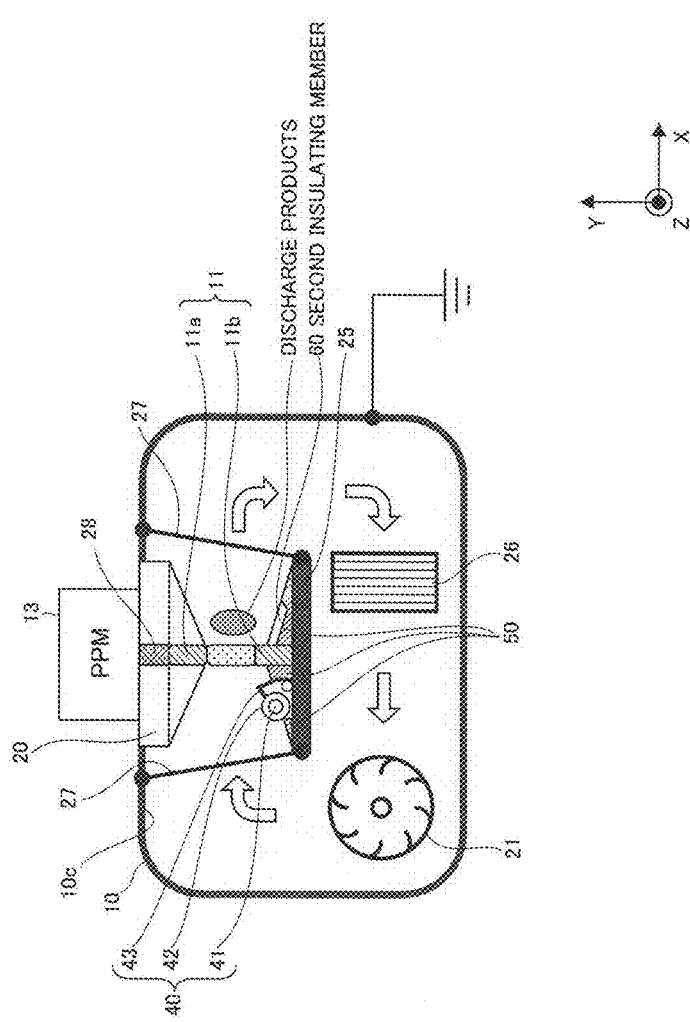
FIG. 4 schematically shows the configuration of the discharge excited gas laser apparatus including the laser chamber according to the present embodiment which includes a second insulating member.
Figure 5:
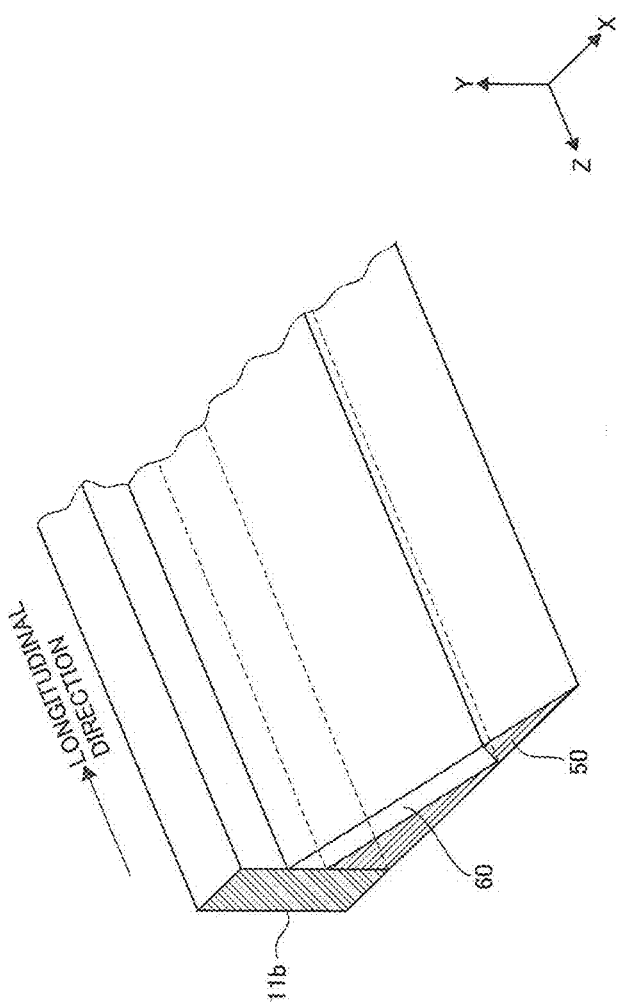
FIG. 5 is a drawing explaining a first example of the second insulating member.

With references to FIGS. 4 to 6, the first example of the second insulating member 60 will be described. FIG. 4 schematically shows the configuration of the discharge excited gas laser apparatus 1 including the laser chamber 10 with the second insulating member according to the present embodiment. FIG. 5 is a drawing explaining the first example of the second insulating member 60. FIG. 5 shows the metallic damper member 50 and the second insulating member 60 disposed downstream of the laser gas flow from the second discharge electrode 11b.

The second insulating member 60 may prevent the discharge generated from the first discharge electrode 11a to the second discharge electrode 11b via the discharge products. The second insulating member 60 may also prevent the discharge generated from the first discharge electrode 11a to the metallic damper member 50 via the discharge products. The second insulating member 60 may be made of an insulating material having a low reactivity with the laser gas. When the laser gas is fluorine, the second insulating member 60 may be made of, for example, alumina ceramics. The second insulating member 60 may be disposed downstream of the laser gas flow from the second discharge electrode 11b. The second insulating member 60 may extend from its base end corresponding to the side surface of the second discharge electrode 11b on the downstream side of the laser gas flow, toward the downstream of the laser gas flow. The second insulating member 60 may be disposed on the tapered surface of the metallic damper member 50 located downstream of the laser gas flow from the second discharge electrode 11b, along the slope of the tapered surface. The second insulating member 60 may have a tapered surface which tapers from the upstream to the downstream. The second insulating member 60 may be disposed to face the discharge products staying near the main discharge part 11.

Figure 6:
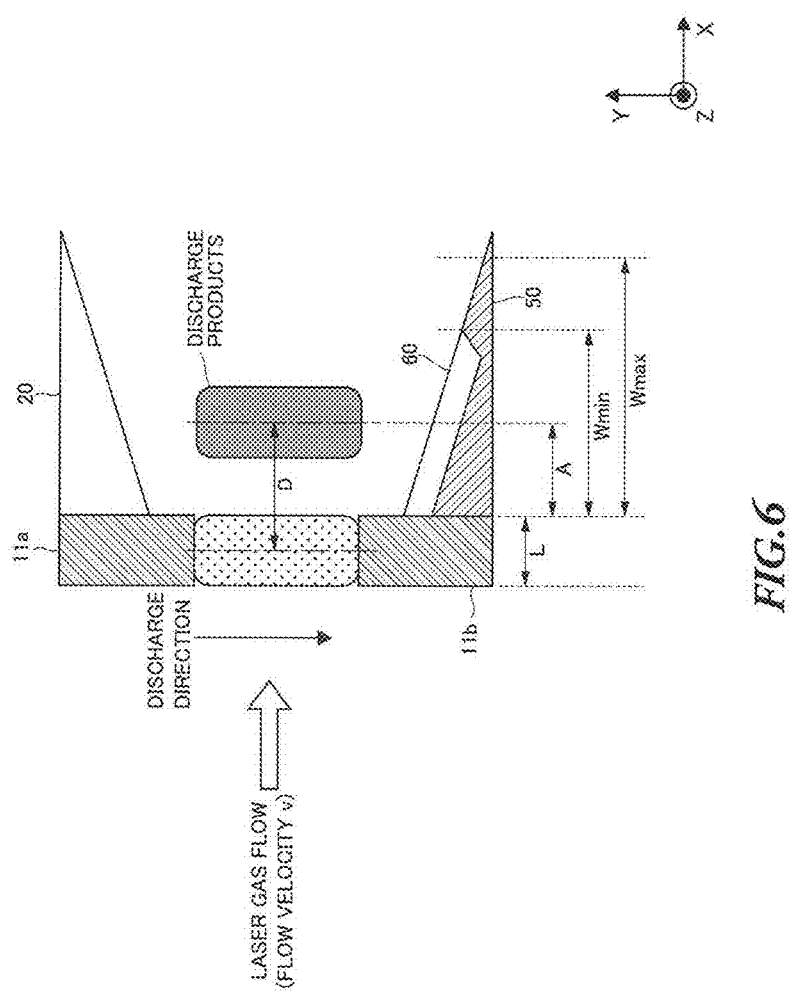
FIG. 6 is a drawing explaining the size of the second insulating member shown in FIG. 5.

FIG. 6 is a drawing explaining the size of the second insulating member 60 shown in FIG. 5. In FIG. 6, L represents the width of the second discharge electrode 11b in the flow direction of the laser gas. W represents the width of the second insulating member 60 in the flow direction of the laser gas. $W_{min}$ and $W_{max}$ represent the minimum value and the maximum value of the width W of the second insulating member 60, respectively. D represents a travel distance of the discharge products moved from the discharge space in the flow direction of the laser gas. A represents the distance from the side surface of the second discharge electrode 11b on the downstream side of the laser gas flow to the center of the discharge products. Here, the width L of the second discharge electrode 11b, the travel distance D of the discharge products, and the width W of the second insulating member 60 may represent lengths in a direction orthogonal to both the longitudinal direction and the discharge direction of the first discharge electrode 11a and the second discharge electrode 11b. The flow velocity of the laser gas flow is represented as v. The flow velocity v may be a predetermined velocity to prevent insulation breakdown between the first discharge electrode 11a and the discharge products, and between the second discharge electrode 11b and the discharge products. The velocity of acoustic waves is represented as c. The repetition frequency of the discharge excited gas laser apparatus 1 is represented as f.

The travel distance D of the discharge products may be calculated from the following equation.

$$D=v/f$$

The distance A from the side surface of the second discharge electrode 11b on the downstream side of the laser gas flow to the discharge products may be calculated from the following equation.

$$A=D-L/2$$

As described above, the second insulating member 60 may prevent the discharge generated from the first discharge electrode 11a to the second discharge electrode 11b via the discharge products, and also prevent the discharge generated from the first discharge electrode 11a to the metallic damper member 50 via the discharge products. It is possible to prevent the discharge generated from the first discharge electrode 11a to the second discharge electrode 11b via the discharge products, as long as the width W of the second insulating member 60 is equal to or longer than the distance A from the side surface of the second discharge electrode 11b on the downstream side of the laser gas flow to the discharge products. Meanwhile, it is possible to prevent the discharge generated from the first discharge electrode 11a to the metallic damper member 50 via the discharge products, as long as the width W of the second insulating member 60 is equal to or longer than the distance A from the side surface of the second discharge electrode 11b on the downstream side of the laser gas flow to the discharge products. Therefore, the width W of the second insulating member 60 may be equal to or greater than a length which is twice as long as the distance A from the side surface of the second discharge electrode 11b on the downstream side of the laser gas flow to the discharge products. That is, the minimum value $W_{min}$ of the width W of the second insulating member 60 may be calculated from the following equation.

$$W_{min}=2A$$

Meanwhile, the second insulating member 60 may not be easier to absorb acoustic waves than the metallic damper member 50. Therefore, the acoustic waves may be reflected from the second insulating member 60 and return to the discharge space. When the acoustic waves reflected from the second insulating member 60 returns to the discharge space, the density of the laser gas in the discharge space may be uneven, and the discharge products may stay near the main discharge part 11. In particular, when the acoustic waves return to the discharge space within a discharge interval, a discharge may be started while the laser gas is unevenly distributed or the discharge products stay near the main discharge part 11. As a result, the main discharge generated in the main discharge part 11 becomes unstable, and therefore the pulse energy of the pulsed laser beam may become unstable. Here, "discharge interval" means a time interval from when a discharge is generated to when the subsequent discharge is newly generated, which corresponds to the inverse number of the repetition frequency. Therefore, the width W of the second insulating member 60 may be a length for which the acoustic waves reflected from the second insulating member 60 cannot return to the discharge space within the discharge interval. That is, the maximum value $W_{max}$ of the width W of the second insulating member 60 may be calculated from the following equation.

$$W_{max}=c/2f$$

Here, ½f in the right side may represent a time limit by which the acoustic waves reflected from the second insulating member 60 does not return to the discharge space within the discharge interval.

Therefore, the width W of the second insulating member 60 in the flow direction of the laser gas may satisfy the following relationship.

$$W_{min} \leq W \leq W_{max} \leftrightarrow (2v/f)=L \leq W \leq c/2f$$

By this means, the laser chamber 10 including the first example of the second insulating member 60 can solve, at a time, problems such as the generation of debris or dust due to the impact of acoustic waves, uneven distribution of the laser gas or the stay of the discharge products due to the reflection of the acoustic waves, and the arc discharge generated via the discharge products. Therefore, it is possible to generate a stable discharge in the laser chamber 10 including the first example of the second insulating member 60 even if the number of the rotation of the fan 21 is reduced. The other configuration of the laser chamber 10 including the first example of the second insulating member 60 may be the same as the configuration of the laser chamber 10 shown in FIGS. 1 and 2.

4.2 Second Example of the Second Insulating Member

Figure 7:
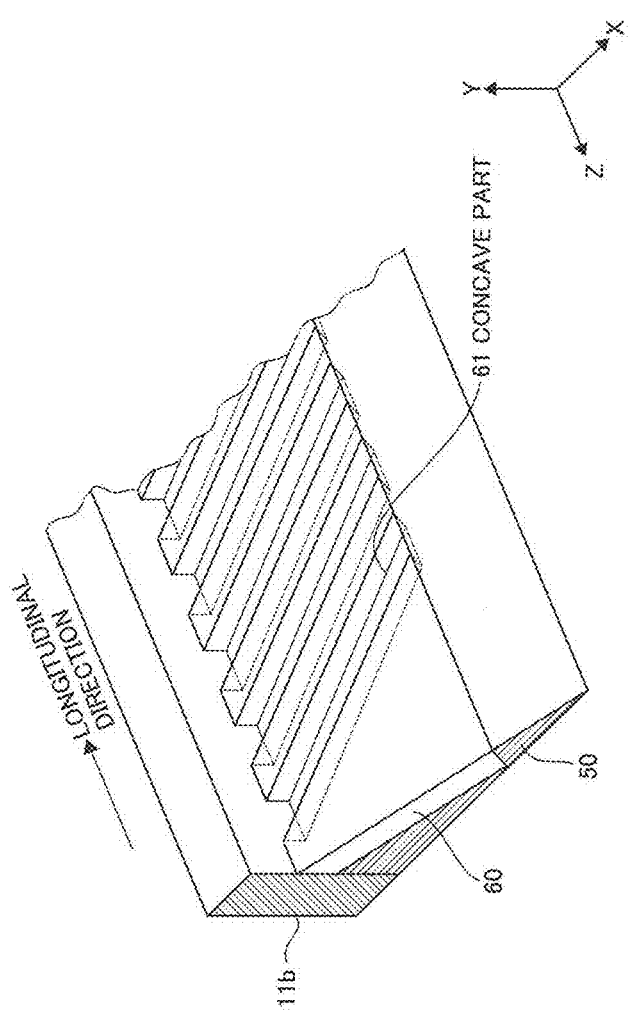
FIG. 7 is a drawing explaining a second example of the second insulating member.

Now, with reference to FIG. 7, the second example of the second insulating member 60 will be described. FIG. 7 is a drawing explaining the second example of the second insulating member 60. FIG. 7 shows the metallic damper member 50 and the second insulating member 60 disposed downstream of the laser gas flow from the second discharge electrode 11b. The same applies to FIGS. 8 to 11.

The second example of the second insulating member 60 may have the configuration including a concave part 61 in addition to the configuration of the first example of the second insulating member 60 shown in FIGS. 4 to 6. The concave part 61 may be formed in the surface of the second insulating member 60. The concave part 61 may be formed to extend and incline to the direction perpendicular to the longitudinal direction of the second discharge electrode 11b. This direction perpendicular to the longitudinal direction of the second discharge electrode 11b may include the flow direction of the laser gas and the discharge direction. To be more specific, the concave part 61 may be formed to extend and incline to the flow direction of the laser gas which is perpendicular to the longitudinal direction of the second discharge electrode 11b. In addition, the concave part 61 may be formed to extend and incline to the discharge direction which is perpendicular to the longitudinal direction of the second discharge electrode 11b. The concave part 61 may be formed along the tapered surface of the metallic damper member 50 located downstream of the laser gas flow from the second discharge electrode 11b. When viewed from the direction in which the concave part 61 extends, the cross-section of the concave part 61 may include square waves.

Acoustic waves generated in the discharge space may be reflected from the concave part 61 of the second insulating member 60 toward various directions. The waves reflected from the concave part 61 toward various directions may have various phases and therefore be weakened by each other. In particular, when the concave part 61 is formed to extend and incline to the direction perpendicular to the longitudinal direction of the second discharge electrode 11b, the acoustic waves may be reflected from the concave part 61 toward further various directions, and therefore be further weakened. Therefore, after being reflected from the concave part 61 of the second insulating member 60, the acoustic waves generated in the discharge space may not be easy to return to the discharge space. Therefore, it is possible to generate a more stable discharge in the laser chamber 10 including the second example of the second insulating member 60 than the laser chamber 10 including the first example of the second insulating member 60. The other configuration of the laser chamber 10 including the second example of the second insulating member 60 may be the same as the configuration of the laser chamber 10 including the first example of the second insulating member 60.

4.3 Third Example of the Second Insulating Member

Figure 8:
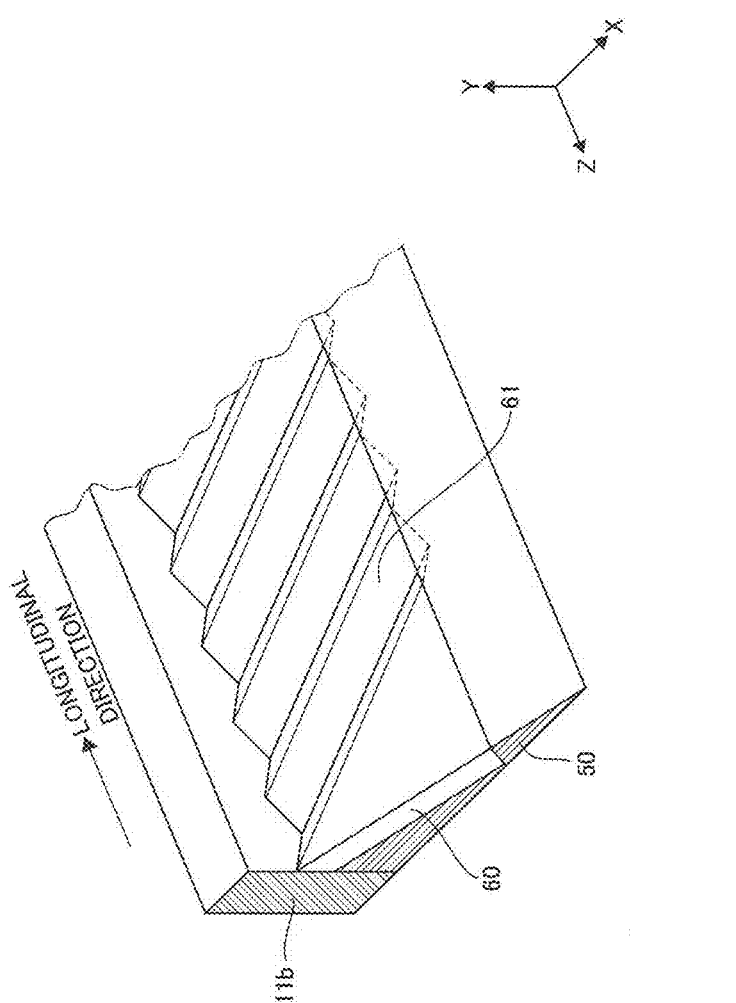
FIG. 8 is a drawing explaining a third example of the second insulating member.

Now, with reference to FIG. 8, the third example of the second insulating member 60 will be described. FIG. 8 is a drawing explaining the third example of the second insulating member 60.

The shape of the concave part 61 of the third example of the second insulating member 60 may be different from the shape of the concave part 61 of the second example of the second insulating member 60 shown in FIG. 7. When viewed from the direction in which the concave part 61 of the third example of the second insulating member 60 extends, the cross-section of the concave part 61 may include triangular or sawtooth waves. By this means, it is possible to generate a stable discharge in the laser chamber 10 including the third example of the second insulating member 60 in the same way as the laser chamber 10 including the second example of the second insulating member 60. The other configuration of the laser chamber 10 including the third example of the second insulating member 60 may be the same as the configuration of the laser chamber 10 including the second example of the second insulating member 60.

4.4 Fourth Example of the Second Insulating Member

Figure 9:
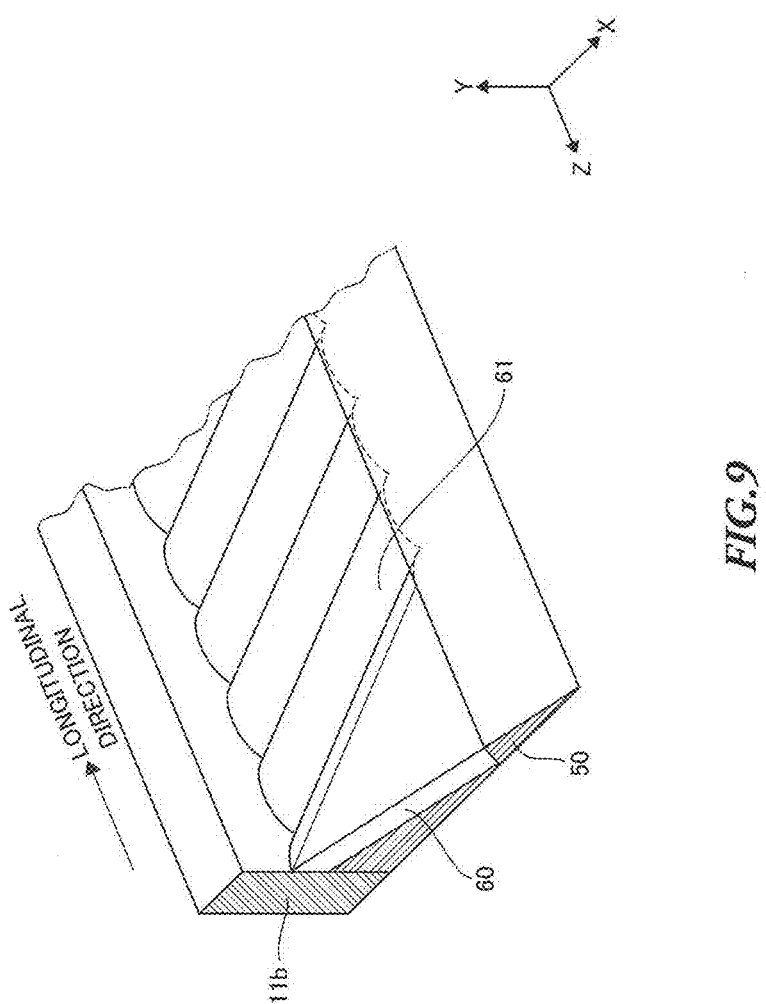
FIG. 9 is a drawing explaining a fourth example of the second insulating member.

Now, with reference to FIG. 9, the fourth example of the second insulating member 60 will be described. FIG. 9 is a drawing explaining the fourth example of the second insulating member 60.

The shape of the concave part 61 of the fourth example of the second insulating member 60 may be different from the shape of the concave part 61 of the second example of the second insulating member 60 shown in FIG. 7. When viewed from the direction in which the concave part 61 of the fourth example of the second insulating member 60 extends, the cross-section of the concave part 61 may include semicircular waves. The semicircular waves may be periodically repeated semicircles. By this means, it is possible to generate a stable discharge in the laser chamber 10 including the fourth example of the second insulating member 60 in the same way as the laser chamber 10 including the second example of the second insulating member 60. The other configuration of the laser chamber 10 including the fourth example of the second insulating member 60 may be the same as the configuration of the laser chamber 10 including the second example of the second insulating member 60.

4.5 Fifth Example of the Second Insulating Member

Figure 10:
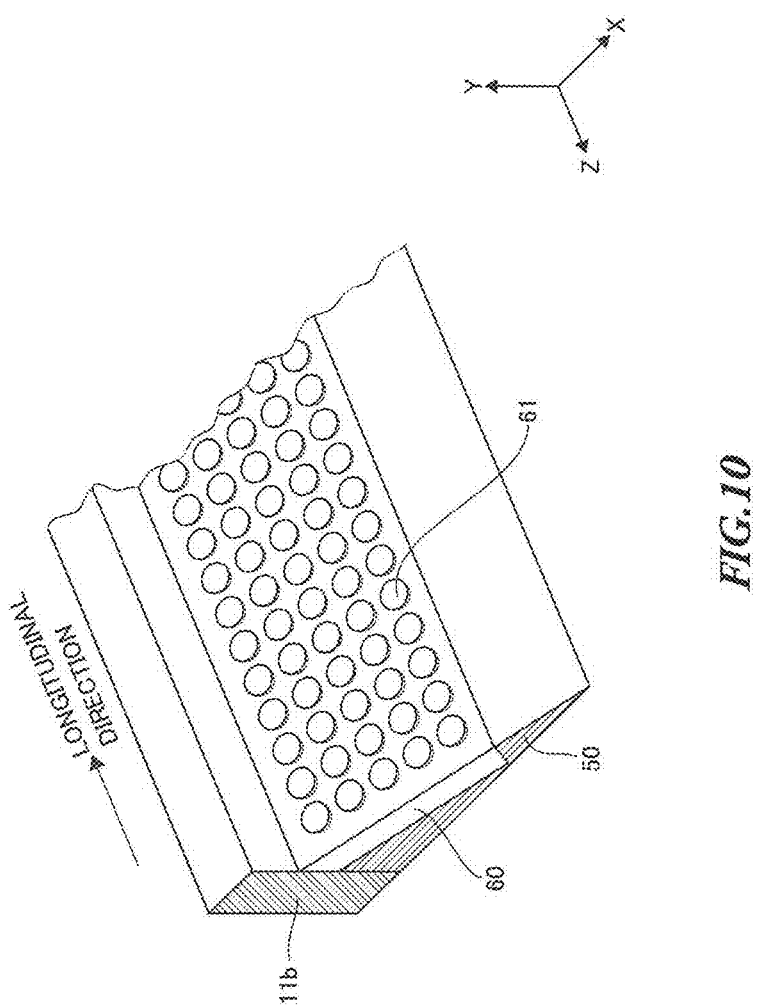
FIG. 10 is a drawing explaining a fifth example of the second insulating member.

Now, with reference to FIG. 10, the fifth example of the second insulating member 60 will be described. FIG. 10 is a drawing explaining the fifth example of the second insulating member 60.

The shape of the concave part 61 of the fifth example of the second insulating member 60 may be different from the shape of the concave part 61 of the second example of the second insulating member 60 shown in FIG. 7. The concave part 61 of the fifth example of the second insulating member 60 may be formed to include a large number of hemispheric dimples. By this means, it is possible to generate a stable discharge in the laser chamber 10 including the fifth example of the second insulating member 60 in the same way as the laser chamber 10 including the second example of the second insulating member 60. The other configuration of the laser chamber 10 including the fifth example of the second insulating member 60 may be the same as the configuration of the laser chamber 10 including the second example of the second insulating member 60.

4.6 Sixth Example of the Second Insulating Member

Now, with reference to FIG. 11, the sixth example of the second insulating member 60 will be described. FIG. 11 is a drawing explaining the sixth example of the second insulating member 60.

The material for forming the sixth example of the second insulating member 60 may be different from that of the first example of the second insulating member 60 shown in FIGS. 4 to 6. The material for forming the sixth example of the second insulating member 60 may have a low reactivity with laser gas, and have a porous structure like the metallic damper member 50. The sixth example of the second insulating member 60 may absorb acoustic waves by itself. By this means, it is possible to generate a more stable discharge in the laser chamber 10 including the sixth example of the second insulating member 60 than the laser chamber 10 including the first example of the second insulating member 60. The other configuration of the laser chamber 10 including the sixth example of the second insulating member 60 may be the same as the configuration of the laser chamber 10 including the first example of the second insulating member 60.

4.7 Specific Example of the Second Insulating Member and the Metallic Damper Member Now, a specific example of the second insulating member 60 and the metallic damper member 50 of the laser chamber 10 according to the present embodiment will be described.

The repetition frequency of the discharge excited gas laser apparatus 1 may be, for example, about 6 kHz. The flow velocity v of the laser gas flow may be, for example, 40 m/s to 45 m/s. In this case, the travel distance D of the discharge products shown in FIG. 6 may be, for example, 6.7 to 7.5 mm. Under these conditions, the second insulating member 60 and the metallic damper member 50 may be formed as follows.

The second insulating member 60 may be formed such that the width W of the second insulating member 60 in the flow direction of the laser gas is, for example, about 16 mm. Here, the width W of the second insulating member 60 in the flow direction of the laser gas may satisfy the relationship of $(2v/f)-L \leq W \leq c/2f$ as described above with reference to FIG. 6. In addition, the surface of the second insulating member 60 may be flat.

The metallic damper member 50 located downstream of the laser gas flow from the second discharge electrode 11b may be formed such that the width of the metallic damper member 50 in the flow direction of the laser gas is, for example, about 50 mm. Here, as shown in FIG. 6, the metallic damper member 50 located downstream of the laser gas flow from the second discharge electrode 11b may be formed to extend further downstream than the second insulating member 60 in the flow direction of the laser gas. By this means, the metallic damper member 50 can absorb acoustic waves generated by the main discharge, and therefore prevent negative effects of the acoustic waves, such as the uneven distribution of the laser gas and the stay of the discharge products.

4.8 Stability of the Main Discharge

Now, with reference to FIGS. 12A to 13, the stability of the main discharge of the laser chamber 10 according to the present embodiment will be described. To be more specific, how much the laser chamber 10 according to the present embodiment can prevent an abnormal arc discharge generated downstream of the laser gas flow will be described. FIG. 12A is a drawing explaining the current path of an arc discharge, produced when the arc discharge is generated in the conventional laser chamber 10 which does not include the second insulating member 60. FIG. 12B is a drawing explaining the current path of an arc discharge produced when the arc discharge is generated in the laser chamber 10 which includes the second insulating member 60 according to the present embodiment.

As described above, the abnormal arc discharge generated downstream of the laser gas flow may be a discharge generated from the first discharge electrode 11a to the second discharge electrode 11b via the discharge products. This arc discharge may be more effectively prevented when the insulation distance in the current path of the arc discharge is longer. With the present embodiment, the insulation distance of the current path of the arc discharge generated from the first discharge electrode 11a to the second discharge electrode 11b via the discharge products may be referred to as "arc insulation distance."

The conventional laser chamber 10 does not include the second insulating member 60. Therefore, as shown in FIG. 12A, a current path P of the arc discharge may be formed to extend from the first discharge electrode 11a to the metallic damper member 50 via the discharge products. To be more specific, the current path P of the arc discharge may be formed to include a current path P1 from the first discharge electrode 11a to the discharge products, a current path P2 in the discharge products, and a current path P3 from the discharge products to the metallic damper member 50. Therefore, an arc insulation distance p in the current path P of the arc discharge in the conventional laser chamber 10 may correspond to the sum of the length of the current path P1 and the current path P3.

Meanwhile, the laser chamber 10 according to the present embodiment may include the second insulating member 60. Therefore, as shown in FIG. 12B, a current path Q of the arc discharge is formed to extend from the first discharge electrode 11a to the second discharge electrode 11b via the discharge products. To be more specific, the current path Q of the arc discharge may be formed to include a current path Q1 from the first discharge electrode 11a to the discharge products, a current path Q2 in the discharge products, and a current path Q3 from the discharge products to the second discharge electrode 11b. Therefore, in the laser chamber 10 according to the present embodiment, an arc insulation distance q in the current path Q of the arc discharge may correspond to the sum of the length of the current path Q1 and the current path Q3.

Figure 13:
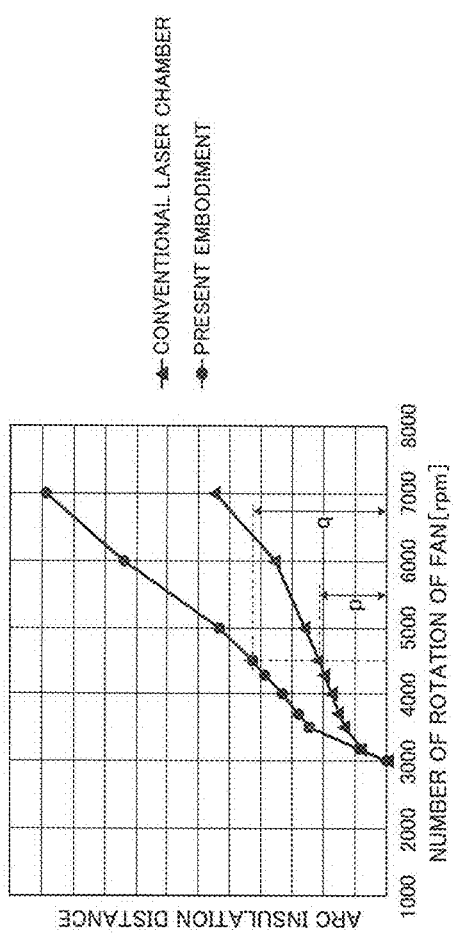
FIG. 13 shows a comparison of a change in an arc insulation distance depending on the number of the rotation of a fan, between the conventional laser chamber shown in FIG. 12A and the laser chamber according to the embodiment shown in FIG. 12B.

FIG. 13 shows the comparison of a change in the arc insulation distance depending on the number of the rotation of the fan 21 between the conventional laser chamber 10 shown in FIG. 12A and the laser chamber 10 according to the present embodiment shown in FIG. 12B. When the number of the rotation of the fan 21 is increased, the flow velocity v of the laser gas flow is increased, and therefore the travel distance D ($=v/f$) of the discharge products may be increased. By this means, the length of the current path of the arc discharge generated downstream of the laser gas flow is increased both in the conventional laser chamber 10 and the laser chamber 10 according to the present embodiment. As a result, as shown in FIG. 13, the arc insulation distance may be increased both in the conventional laser chamber 10 and the laser chamber 10 according to the present embodiment.

However, as shown in FIG. 13, when the number of the rotation of the fan 21 is the same as between the conventional laser chamber 10 and the laser chamber 10 according to the present embodiment, the arc insulation distance q in the laser chamber 10 according to the present embodiment may be longer than the arc insulation distance p in the conventional laser chamber 10. For example, when the number of the rotation of the fan 21 is 4500 rpm (revolution per minute), the arc insulation distance q in the laser chamber 10 according to the present embodiment may be about twice as long as the arc insulation distance p of the conventional laser chamber 10. Therefore, the laser chamber 10 including the second insulating member 60 according to the present embodiment can more effectively and significantly prevent an abnormal arc discharge generated downstream of the laser gas flow than the conventional laser chamber. Therefore, the laser chamber 10 including the second insulating member 60 according to the present embodiment can more significantly improve the stability of the main discharge than the conventional laser chamber 10.

In other words, when the arc insulation distance is the same as between the conventional laser chamber 10 and the laser chamber 10 according to the present embodiment, the number of the rotation of the fan 21 of the laser chamber 10 according to the present embodiment may be significantly smaller than that of the conventional laser chamber 10. Therefore, the laser chamber 10 including the second insulating member 60 according to the present embodiment can more significantly reduce the power consumption of the motor 22 driving the fan 21 than the conventional laser chamber 10.

5. OTHERS

5.1 Charge and Discharge Circuit

Now, with reference to FIG. 14, a charge and discharge circuit for the discharge excited gas laser apparatus 1 will be described. FIG. 14 is a drawing explaining the circuit configuration of the charge and discharge circuit used in the discharge excited gas laser apparatus 1.

The PPM 13 may include a semiconductor switch as the above-described switch 13a, a transformer $TC_1$, magnetic switches $MS_1$ to $MS_3$, a charging condenser $C_0$, and condensers $C_1$ to $C_3$. When the value of the time integration of the voltages applied to the magnetic switches $MS_1$ to $MS_3$ reaches a threshold value, a current is easy to flow to the magnetic switches $MS_1$ to $MS_3$. The threshold value may be different for each of the magnetic switches. With the present embodiment, the state in which the magnetic switches $MS_1$ to $MS_3$ are easy to flow a current therethrough may be described as "the magnetic switch is closed."

The switch 13a may be provided between the primary side of the transformer $TC_1$ and the charging condenser $C_0$. The magnetic switch $MS_1$ may be provided between the secondary side of the transformer $TC_1$ and the condenser $C_1$. The magnetic switch $MS_2$ may be provided between the condenser $C_1$ and the condenser $C_2$. The magnetic switch $MS_3$ may be provided between the condenser $C_2$ and the condenser $C_3$. The primary side and the secondary side of the transformer $TC_1$ may be electrically insulated from one another. The direction of the winding of the primary side of the transformer $TC_1$ may be opposite to that of the secondary side.

The second discharge electrode 11b and the preliminary ionization outer electrode 43 may be connected to ground. A voltage-dividing circuit including condensers $C_{11}$ and $C_{12}$ and an inductor $L_0$ may be connected in parallel to the first discharge electrode 11a and the second discharge electrode 11b. The condensers $C_{11}$ and $C_{12}$, and the inductor $L_0$ may be connected to each other in series.

Now, the operation of the charge and discharge circuit shown in FIG. 14 will be described. The controller 30 may set the charging voltage Vhv in the charger 12. The charger 12 may charge the charging condenser $C_0$ based on the charging voltage Vhv set therein. The controller 30 may output an oscillation trigger signal to the switch 13a of the PPM 13. Upon receiving the oscillation trigger signal, the switch 13a of the PPM 13 may be turned on. When the switch 13a is turned on, a current can flow from the charging condenser $C_0$ to the primary side of the transformer $TC_1$.

When the current flows in the primary side of the transformer $TC_1$, a current in the opposite direction may flow in the secondary side of the transformer $TC_1$ due to electromagnetic induction. When the current flows in the secondary side of the transformer $TC_1$, the value of the time integration of the voltage applied to the magnetic switch $MS_1$ reaches a threshold value. When the value of the time integration of the voltage applied to the magnetic switch $MS_1$ reaches the threshold value, a magnetic saturation occurs in the magnetic switch $MS_1$, and therefore the magnetic switch $MS_1$ may be closed. When the magnetic switch $MS_1$ is closed, the current flows from the secondary side of the transformer $TC_1$ to the condenser $C_1$, so that the condenser $C_1$ can be charged.

After the condenser $C_1$ is charged, a magnetic saturation may occur in the magnetic switch $MS_2$, and therefore the magnetic switch $MS_2$ may be closed. When the magnetic switch $MS_2$ is closed, the current may flow from the condenser $C_1$ to the condenser $C_2$, and therefore the condenser $C_2$ may be charged. In this case, the condenser $C_2$ may be charged with the pulse width of the current shorter than the pulse width of the current for charging the condenser $C_1$.

After the condenser $C_2$ is charged, a magnetic saturation may occur in the magnetic switch $MS_3$, and therefore the magnetic switch $MS_3$ may be closed. After the magnetic switch $MS_3$ is closed, the current may flow from the condenser $C_2$ to the condenser $C_3$, and therefore the condenser $C_3$ may be charged. In this case, the condenser $C_3$ may be charged with the pulse width of the current shorter than the pulse width of the current for charging the condenser $C_2$.

As described above, the current flows from the condenser $C_1$ to the condenser $C_2$, and then from the condenser $C_2$ to the condenser $C_3$ in sequence, and therefore the pulse width of the current can be compressed.

After being charged, the condenser $C_3$ can apply a pulse voltage between the first discharge electrode 11a and the second discharge electrode 11b. Here, when the pulse voltage applied between the first discharge electrode 11a and the second discharge electrode 11b is greater than the insulation voltage of the laser gas, the insulation breakdown of the laser gas may occur. When the insulation breakdown of the laser gas occurs, a main discharge is generated between the first discharge electrode 11a and the second discharge electrode 11b. In this case, a negative potential may be applied to the first discharge electrode 11a.

The voltage-dividing circuit connected in parallel to the first discharge electrode 11a and the second discharge electrode 11b may divide the pulse voltage applied between the first discharge electrode 11a and the second discharge electrode 11b. The range of the divided pulse voltage may be 25% to 75% of the pulse voltage applied between the first discharge electrode 11a and the second discharge electrode 11b. The divided pulse voltage may be applied between the preliminary ionization inner electrode 41 and the preliminary ionization outer electrode 43. The time constant of the voltage-dividing circuit may be adjusted to a desired value by adjusting the division ratio of the voltage-dividing circuit, the capacitance of each of the condensers $C_{11}$ and $C_{12}$, and the inductance of the inductor $L_0$. By this means, it is possible to adjust the timing of the preliminary ionization discharge for the main discharge. The combined capacitance of the capacitors in the voltage-dividing circuit may be equal to or lower than 10% of the capacitance of the condenser $C_3$.

5.2 Hardware Environment of Each Controller

A person skilled in the art would understand that the subject matters disclosed herein can be implemented by combining a general purpose computer or a programmable controller with a program module or a software application. In general, the program module includes routines, programs, components and data structures which can execute the processes disclosed herein.

Figure 15:
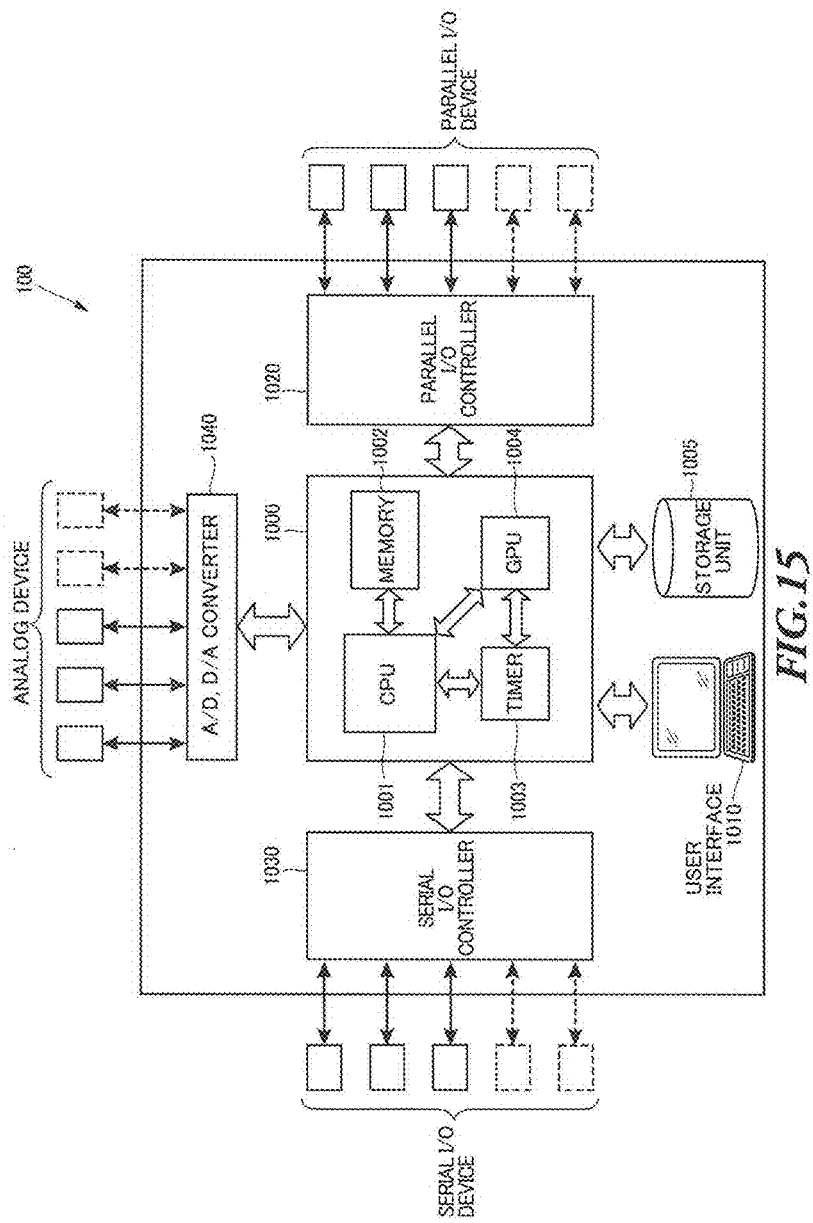
FIG. 15 is a block diagram showing the hardware environment of each controller.

FIG. 15 is a block diagram showing an exemplary hardware environment in which various aspects of the subject matters disclosed herein can be implemented. An exemplary hardware environment 100 shown in FIG. 15 may include a processing unit 1000, a storage unit 1005, a user interface 1010, a parallel I/O controller 1020, a serial I/O controller 1030, and an A/D, D/A converter 1040, but the configuration of the hardware environment 100 is not limited to this.

The processing unit 1000 may include a central processing unit (CPU) 1001, a memory 1002, a timer 1003, and a graphics processing unit (GPU) 1004. The memory 1002 may include a random access memory (RAM) and a read only memory (ROM). The CPU 1001 may be any of commercially available processors. A dual microprocessor or another multiprocessor architecture may be used as the CPU 1001.

The components shown in FIG. 15 may be interconnected with each other to perform the processes described herein.

During its operation, the processing unit 1000 may read and execute the program stored in the storage unit 1005, read data together with the program from the storage unit 1005, and write the data to the storage unit 1005. The CPU 1001 may execute the program read from the storage unit 1005. The memory 1002 may be a work area in which the program executed by the CPU 1001 and the data used in the operation of the CPU 1001 are temporarily stored. The timer 1003 may measure a time interval and output the result of the measurement to the CPU 1001 according to the execution of the program. The GPU 1004 may process image data according to the program read from the storage unit 1005, and output the result of the process to the CPU 1001.

The parallel I/O controller 1020 may be connected to a parallel I/O device that can communicate with the processing unit 1000, such as the controller 30. The parallel I/O controller 1020 may control the communication between the processing unit 1000 and this parallel I/O device. The serial I/O controller 1030 may be connected to serial I/O devices that can communicate with the processing unit 1000, such as the charger 12, the PPM 13, the motor 22, the laser gas supply part 23, the laser gas discharge part 24, and the heat exchanger 26. The serial I/O controller 1030 may control the communication between the processing unit 1000 and those serial I/O devices. The A/D, D/A converter 1040 may be connected to analog devices such as the temperature sensor, the pressure sensor 16, various sensors for a vacuum gauge, and the optical sensor 17c via analog ports, may control the communication between the processing unit 1000 and those analog devices, and may perform A/D, D/A conversion of the contents of the communication.

The user interface 1010 may present the progress of the program executed by the processing unit 1000 to an operator, in order to allow the operator to command the processing unit 1000 to stop the program and to execute an interruption routine.

The exemplary hardware environment 100 may be applicable to the controller 30 in the present disclosure. A person skilled in the art would understand that the controller may be realized in a distributed computing environment, that is, an environment in which tasks are performed by the processing units connected to each other via a communication network. In this disclosure, the controller 30 may be connected to the other components via a communication network such as Ethernet or Internet. In the distributed computing environment, the program module may be stored in both of a local memory storage device and a remote memory storage device.

5.3 Modification

A high-reflection mirror may be used for the discharge excited gas laser apparatus 1 instead of LNM 14. In this discharge excited gas laser apparatus 1, spontaneously excited light whose spectral line width is not narrowed may be outputted to the exposure device 110 as a pulsed laser beam. The discharge excited gas laser apparatus 1 may not be an excimer laser apparatus, but be a fluorine molecule laser apparatus using fluorine gas and buffer gas as laser gas.

The first discharge electrode 11a may not be a cathode electrode but be an anode electrode. The second discharge electrode 11b may not be an anode electrode but be a cathode electrode.

The tapered surface of the first insulating member 20 may be formed by the metallic damper member 50. Here, electric insulation may need to be provided between the metallic damper member 50 and the wall 10c of the laser chamber 10 in order to prevent a discharge.

It would be obvious to a person skilled in the art that the technologies described in the above-described embodiments including the modifications may be compatible with each other.

The descriptions above are intended to be illustrative only and the present disclosure is not limited thereto. Therefore, it will be apparent to those skilled in the art that it is possible to make modifications to the embodiments of the present disclosure within the scope of the appended claims.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "a/an" in this specification and the appended claims should be interpreted as "at least one" or "one or more."

REFERENCE SIGNS LIST 1 discharge excited gas laser apparatus
10 laser chamber
11 main discharge part
11a first discharge electrode
11b second discharge electrode
20 first insulating member
21 fan
30 controller
50 metallic damper member
60 second insulating member
61 concave part

The invention claimed is:

1. A laser chamber for a discharge excited gas laser apparatus, comprising:
   a first discharge electrode disposed in the laser chamber;
   a second discharge electrode disposed to face the first discharge electrode in the laser chamber;
   a fan configured to flow laser gas between the first discharge electrode and the second discharge electrode;
   a first insulating member disposed upstream and downstream of a laser gas flow from the first discharge electrode;
   a first metallic damper member disposed upstream of the laser gas flow from the second discharge electrode;
   a second metallic damper member disposed downstream of the laser gas flow from the second discharge electrode; and
   a second insulating member disposed downstream of the laser gas flow from the second discharge electrode, and having a base end that contacts to a downstream side surface of the second discharge electrode, the second insulating member extending from the base end toward the downstream of the laser gas flow,
   wherein the second metallic damper member has a tapered surface which tapers from the upstream to the downstream, and
   the second insulating member is disposed on the tapered surface of the second metallic damper member, along the slope of the tapered surface.

2. The laser chamber according to claim 1, wherein a concave part is formed in a surface of the second insulating member.

3. The laser chamber according to claim 2, wherein:
   the first discharge electrode and the second discharge electrode are each formed in a plate shape; and the concave part is formed to extend and incline to a direction perpendicular to a longitudinal direction of the second discharge electrode.

4. The laser chamber according to claim 3, wherein the first discharge electrode is a cathode electrode, and the second discharge electrode is an anode electrode.

5. The laser chamber according to claim 1, wherein the surface of the second insulating member is flat.

6. The laser chamber according to claim 1, wherein the second insulating member is formed to satisfy a following relationship:

$$(2v/f)-L \leq W \leq c/2f$$

where, f represents a repetition frequency of the discharge excited gas laser apparatus, c represents a velocity of acoustic waves generated by a discharge between the first discharge electrode and the second discharge electrode, v represents a flow velocity of the laser gas flow, L represents a width of the second discharge electrode in a flow direction of the laser gas flow, and W represents a width of the second insulating member in the flow direction of the laser gas flow.

7. The laser chamber according to claim 1, wherein the second insulating member is disposed only downstream of the laser gas flow from the second discharge electrode.

8. The laser chamber according to claim 1, wherein the second discharge electrode protrudes toward the first discharge electrode further than the second insulating member.

9. The laser chamber according to claim 2, wherein the concave part is formed to extend and incline to a direction perpendicular to a longitudinal direction of the second discharge electrode.

10. The laser chamber according to claim 2, wherein a cross-section of the concave part has a shape of triangular or sawtooth waves.

11. The laser chamber according to claim 2, wherein a cross-section of the concave part has a shape of semicircular waves.

12. The laser chamber according to claim 2, wherein the concave part includes hemispheric dimples.

13. The laser chamber according to claim 1, wherein the second insulating member has a porous structure.

14. A laser chamber for a discharge excited gas laser apparatus, comprising:
a first discharge electrode disposed in the laser chamber;
a second discharge electrode disposed to face the first discharge electrode in the laser chamber;
a fan configured to flow laser gas between the first discharge electrode and the second discharge electrode;
a first insulating member disposed upstream and downstream of a laser gas flow from the first discharge electrode;
a first metallic damper member disposed upstream of the laser gas flow from the second discharge electrode;
a second metallic damper member disposed downstream of the laser gas flow from the second discharge electrode; and
a second insulating member disposed on a surface of a portion of the second metallic damper member,
wherein the second metallic damper member contacts with the second discharge electrode at the portion, and
the second insulating member faces a discharge space formed between the first discharge electrode and the second discharge electrode.

15. The laser chamber according to claim 14, wherein a concave part is formed in a surface of the second insulating member.

16. The laser chamber according to claim 14, wherein the surface of the second insulating member is flat.

17. The laser chamber according to claim 14, wherein the second insulating member is formed to satisfy a following relationship:

$$(2v/f)-L \leq W \leq c/2f$$

where, f represents a repetition frequency of the discharge excited gas laser apparatus, c represents a velocity of acoustic waves generated by a discharge between the first discharge electrode and the second discharge electrode, v represents a flow velocity of the laser gas flow, L represents a width of the second discharge electrode in a flow direction of the laser gas flow, and W represents a width of the second insulating member in the flow direction of the laser gas flow.

18. The laser chamber according to claim 14, wherein the second insulating member is disposed only downstream of the laser gas flow from the second discharge electrode.

19. The laser chamber according to claim 14, wherein the second discharge electrode protrudes toward the first discharge electrode further than the second insulating member.

20. The laser chamber according to claim 14, wherein the second insulating member has a porous structure.

* * * * *